United States Patent [19]

Davy et al.

[11] 3,898,370

[45] Aug. 5, 1975

[54] ARRANGEMENT FOR CONNECTING ELECTRICAL CIRCUITS

[75] Inventors: Gerald Davy, Noisy-Le Roi; Jean-Claude Petiot, Paris; Bernard Le Govic, Sarcelles, all of France

[73] Assignee: Compagnie Honeywell Bull, Paris, France

[22] Filed: Aug. 21, 1974

[21] Appl. No.: 499,383

[30] Foreign Application Priority Data

Aug. 24, 1973 France .............................. 73.30787

[52] U.S. Cl. .......... 174/68.5; 29/625; 317/101 CM; 317/101 CE

[51] Int. Cl. .............................................. H05k 1/04

[58] Field of Search ............174/68.5; 317/101 CC, 317/101CM, 101CE; 29/625-627

[56] References Cited

UNITED STATES PATENTS

| | | | |
|---|---|---|---|
| 3,193,731 | 7/1965 | Gerlach et al. | 317/101 CE |
| 3,564,114 | 2/1971 | Blinder et al. | 174/68.5 |
| 3,796,848 | 3/1974 | Southworth, Jr. | 317/101 CE X |

*Primary Examiner*—Darrell Clay
*Attorney, Agent, or Firm*—David A. Frank; Ronald T. Reiling

[57] ABSTRACT

An improved arrangement for connecting electrical circuits. A plurality of superimposed insulating sheets carry networks of conductive strips which join connecting and linking members. The arrangement of the conductive strips on an external face of the device allows for alteration of the circuits.

3 Claims, 2 Drawing Figures

ARRANGEMENT FOR CONNECTING ELECTRICAL CIRCUITS

BACKGROUND OF THE INVENTION

1. Field of the Invention

The present invention relates generally to arrangements for connecting electrical circuits and for specifically to connection arrangements on a plurality of superimposed sheets.

2. Description of the Prior Art

Arrangements for connecting electrical circuits are known which are formed by a plurality of superimposed insulating sheets which are joined together. The faces of these sheets carry networks of conductive strips. These known arrangements incorporate linking members, such as metal-lined holes or metal pillars, which pass through the sheets and which enable conductive strips situated at different levels to be linked electrically so as to form continuous lines made up of sections situated in different planes. In order that certain points along each line may be linked to the electrical circuits connecting members are provided within the connection arrangement. The connecting members are linked to the conductive strips. The connecting members may be metal-lined holes or connector contacts. The connection terminals from the circuits are soldered into and onto the connecting members.

Known arrangements of this type have a serious drawback in that they cannot be altered after the initial lay-out. In effect, the connecting members are connected to the conductive strips permanently.

OBJECTS OF THE INVENTION

It is an object of the present invention therefore to provide an improved arrangement for connecting electrical circuits.

It is another object of the present invention to provide an arrangement for connecting electrical circuits which allows the connections of the external circuits to be at least partly altered.

Other objects and advantages of the invention will become apparent from the following description of the preferred embodiment of the invention when read in conjunction with the drawings contained herewith.

SUMMARY OF THE INVENTION

The arrangement for connecting electrical circuits is formed by a plurality of superimposed insulating sheets. The sheets are joined together and the faces of the sheets carry networks of conductive strips. The arrangement incorporates linking members which enable the conductive strips situated at different levels to be linked electrically so as to form continuous lines made up of sections situated in different planes. Connecting members enable certain points along the lines to be linked to the electrical circuits. The portion of a line which is connected to a connecting member is formed by a strip carried on an external face of the arrangement. The other end of the strip is connected to an intermediate part of an external bridge which is arranged between the connecting member and an adjacent linking member. The linking member provides a link between the strip on the external face and a consecutive strip at the interior of the arrangement.

By cutting the bridge between the connecting member and the strip, it is possible to disconnect the connecting member from the line. Preferably, the bridge is formed by a conductive strip carried on an external face of the arrangement. The bridge may be cut by scraping or rubbing away the strip forming it. It is also possible to alter the way in which the arrangement is connected by partly removing the strips forming the sections of the line. It is however necessary in both cases (i.e., when bridges are cut and when sections of line are cut) to ensure that the segments of strip which are left are not long enough to form antennas capable of introducing interference on the lines.

It is advantageous for the ends of each conductive strip in a line on the inside of the arrangement to be joined to a linking member. Where connecting members are arranged along the whole length of a line, the latter is formed by alternating sections at the interior and exterior of the arrangement.

DESCRIPTION OF THE PREFERRED EMBODIMENT

Figure 1:
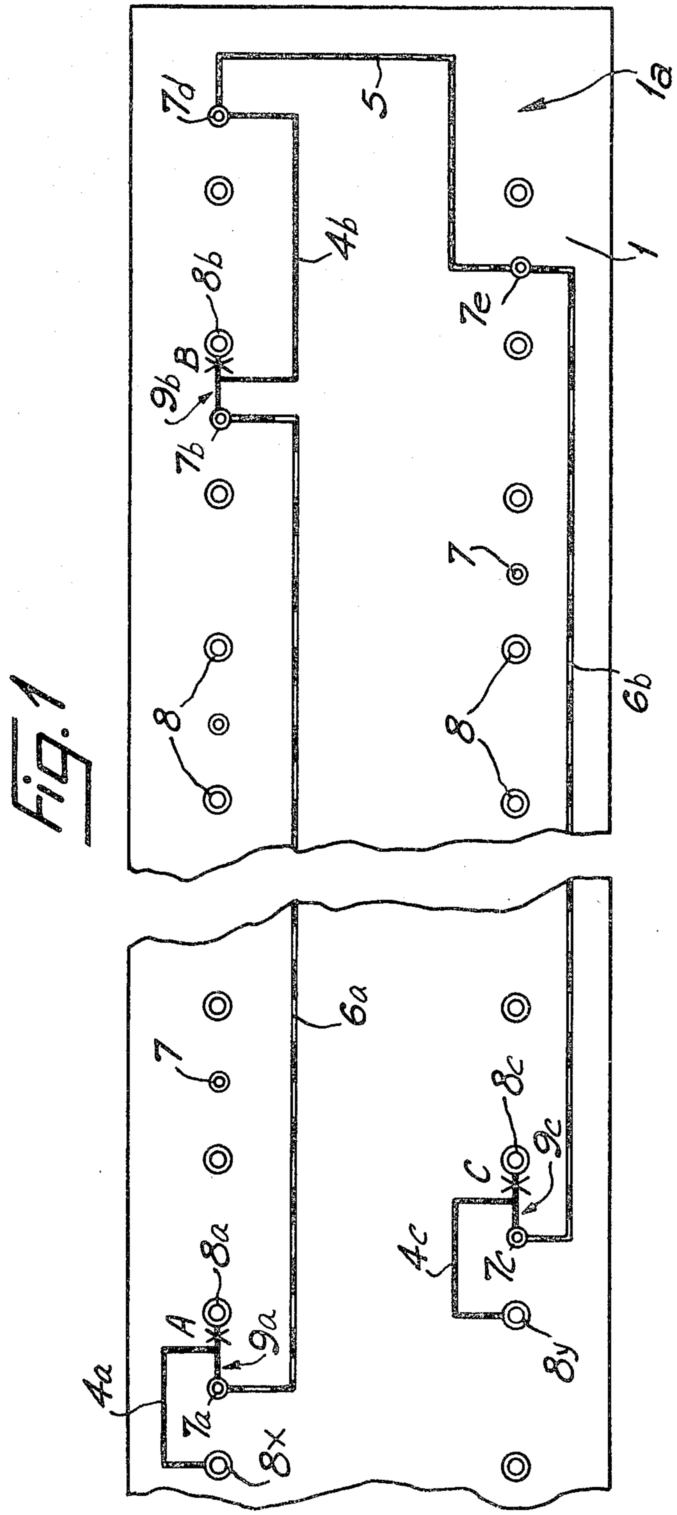
FIG. 1 is a partial view of a connection arrangement according to the invention.
Figure 2:
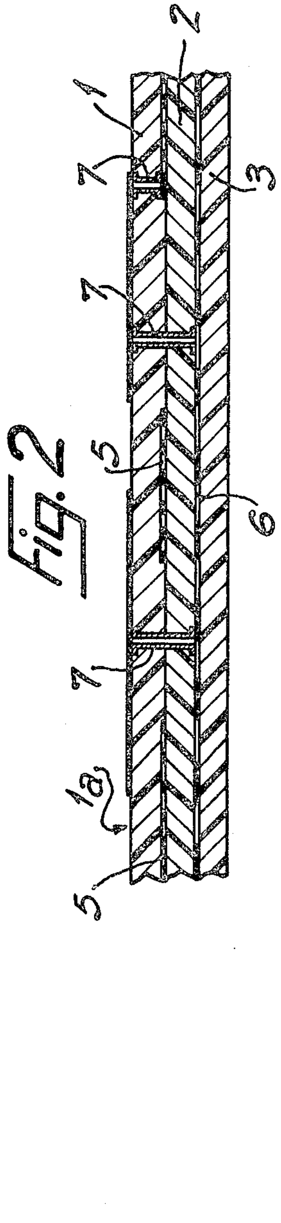
FIG. 2 is a schematic cross-sectional view of part of the device in FIG. 1.

Referring to FIGS. 1 and 2, on each of three superimposed insulating sheets 1, 2 and 3, are arranged electrical conductors formed by metal strips. The exposed face 1*a* of sheet 1 (see FIG. 1) carries electrical conductors 4 (shown in solid lines). Sheet 2 has arranged on it conductors 5 (shown in short dashes) which are therefore located between sheets 1 and 2. Sheet 3 has arranged on it conductors 6 (shown in long dashes) which are therefore located between sheets 2 and 3.

Regularly distributed linking members 7, such as metal-lined holes or metal pillars, enable the conductors 4, 5, 6, which are situated at different levels, to be linked together to form a line. In addition, regularly distributed connecting members 8, such as metal contacts or metal-lined holes, enable the arrangement according to the invention to be linked to external electrical devices, such as printed circuit boards. There is no necessity for all of the linking members 7 or all of connecting members 8 to be used for only one line.

Each of the conductors 5, 6 are inaccessible from the exterior. Each of the conductors 5, 6 runs from one linking member 7 to another. This is contrast to the external conductors 4 which are connected, at one end at least, to the intermediate portion of a bridge 9. The bridge 9 is arranged between a linking member 7 and a connecting member 8. These bridges 9 may each be formed by a metal strip carried on face 1*a* of sheet 1.

The electrical circuit which is shown as an example in FIG. 1 allows electrical continuity to be established between a plurality of connecting members 8 (8*x*, 8*y*, 8*a*, 8*b*, 8*c*) via conductors 4, 5, 6. The conductors 4, 5, 6, although on different levels form the connecting line. Beginning at the upper left portion of FIG. 1, connecting member 8 is linked by an external conductor 4*a* to the central part of a bridge 9*a*. The bridge 9*a* links a connecting member 8*a* and a linking member 7*a*. The latter is connected to linking member 7*b* via a conductor 6*a*. The linking member 7*b* is linked by a bridge 9*b* to a connecting member 8*b*. The central portion of the bridge 9*b* is connected to an end of a conductor 4*b*. The other end of the conductor 4*b* is connected to a linking member 7*d*. Conductor 5 links linking member 7*d* to another linking member 7*e;* a conductor 6*b* links linking member 7*c* to another linking member 7*c*. Linking member 7*c* is linked by a bridge 9*c* to a connecting member 8*c*. A conductor 4*c* links the connecting member 8*y* to the central portion of the bridge 9*c*.

In this manner, electrical continuity is provided between the connecting members 8*a*, 8*b*, 8*c*, 8*x*, 8*y* by the circuit which has just been described.

If portions of the bridges 9 (9*a*, 9*b*, 9*c*) are scraped away, at points A, B or C for example, the connecting members 8*a*, 8*b*, 8*c* will no longer be linked to the circuit. Similarly, by cutting the conductors 4*a*, 4*b*, 4*c* or other sections of bridges 9, the electrical continuity of the circuit may be broken so as to disconnect connecting members 8*x*, 8*y* or 8*a*, 8*b*, 8*c*, 8*x*, 8*y* as desired. However, care must be taken that the sections of conductors 4 or of bridges 9 are cut such that the remaining sections are not long enough to function antennas.

What is claimed is:

1. A device interconnecting electrical circuits, said device comprising a plurality of superimposed insulating sheets joined together at least on faces, each of said sheets carrying networks of conductive strips comprising:

a plurality of linking members electrically connected to the conductive strips situated on different one of said sheets forming continuous conductors composed of sections of said conducting strips situated on different ones of said sheets;

a plurality of connecting members electrically coupling said continuous conductors to electrical circuits;

a plurality of bridges, each of said bridges electrically coupling one of said connecting members to an adjacent one of said linking members; and each of the sections of said conductive strips carried on an external face of the device coupling one of said connecting members to an intermediate part of one of said bridges.

2. A device according to claim 1, wherein said bridges are conductive strips carried on an external face of the device.

3. A device according to claim 1, wherein in the ends of each section of the conductive strips in the interior of the superimposed sheets are each coupled to one of said linking members.

* * * * *